United States Patent
Mahamuni et al.

(10) Patent No.: US 7,042,885 B2
(45) Date of Patent: May 9, 2006

(54) SYSTEM AND METHOD FOR IMPLEMENTING A DISTRIBUTED SERVICE PLATFORM USING A SYSTEM-WIDE SWITCHTAG DEFINITION

(75) Inventors: Atul Mahamuni, San Jose, CA (US); Chi Fai Ho, Sunnyvale, CA (US)

(73) Assignee: Nokia Inc., Irving, TX (US)

( * ) Notice: Subject to any disclaimer, the term of this patent is extended or adjusted under 35 U.S.C. 154(b) by 0 days.

(21) Appl. No.: 10/313,946

(22) Filed: Dec. 5, 2002

(65) Prior Publication Data

US 2004/0109456 A1    Jun. 10, 2004

(51) Int. Cl.
*H04L 12/28* (2006.01)

(52) U.S. Cl. ............... 370/396; 370/400; 370/389; 370/395.31

(58) Field of Classification Search ........... 370/396, 370/395.3, 395.31, 400, 471, 389, 401, 352; 379/220.1
See application file for complete search history.

(56) References Cited

U.S. PATENT DOCUMENTS

| | | | | |
|---|---|---|---|---|
| 5,892,924 A * | 4/1999 | Lyon et al. | ............... | 709/245 |
| 5,917,820 A * | 6/1999 | Rekhter | ............... | 370/392 |
| 5,951,651 A * | 9/1999 | Lakshman et al. | ............... | 709/239 |
| 6,104,700 A * | 8/2000 | Haddock et al. | ............... | 370/235 |
| 6,148,000 A * | 11/2000 | Feldman et al. | ............... | 370/397 |
| 6,157,955 A * | 12/2000 | Narad et al. | ............... | 709/228 |
| 6,182,228 B1 * | 1/2001 | Boden et al. | ............... | 713/201 |
| 6,606,315 B1 * | 8/2003 | Albert et al. | ............... | 370/352 |
| 6,628,654 B1 * | 9/2003 | Albert et al. | ............... | 370/389 |
| 6,633,560 B1 * | 10/2003 | Albert et al. | ............... | 370/351 |
| 6,650,641 B1 * | 11/2003 | Albert et al. | ............... | 370/392 |
| 6,701,338 B1 * | 3/2004 | Narad et al. | ............... | 708/525 |
| 2002/0009050 A1 * | 1/2002 | Ueno | ............... | 370/230 |
| 2003/0031192 A1 * | 2/2003 | Furuno | ............... | 370/428 |
| 2003/0067934 A1 * | 4/2003 | Hooper et al. | ............... | 370/428 |
| 2003/0185226 A1 * | 10/2003 | Tang et al. | ............... | 370/428 |
| 2003/0202647 A1 * | 10/2003 | Liesenberg | ............... | 379/220.1 |
| 2003/0210705 A1 * | 11/2003 | Seddigh et al. | ............... | 370/419 |
| 2004/0004956 A1 * | 1/2004 | Gilmour et al. | ............... | 370/352 |

OTHER PUBLICATIONS

Downey, Tom. "Overview of Tag Switching", Electronics Industries Forum of New England, 1997, pp. 61-66.*
Xiao, Xipeng, et al. "An Overview of IP Switching and Tag Switching". Parallel and Distributed Systems, 1997, pp. 669-675.*
"Scaling the Internet With Tag Switching". IP Routing vs. ATM Switching—What are the Real Issues?, Digest No.: 1997/334, IEE Colloquium, 1997.*

* cited by examiner

*Primary Examiner*—Frank Duong
*Assistant Examiner*—Michael J. Moore
(74) *Attorney, Agent, or Firm*—Darby & Darby PC; Bruce E. Black

(57) ABSTRACT

A system and method for configuring components of a distributed routing platform using switchtags. The distributed routing platform includes transport service modules that are configured to perform a service on packets. Each of the transport service modules is further configured to perform the service on certain types of packets and to encapsulate other types of packets with a switchtag and forward them to another transport service module in the distributed routing platform.

23 Claims, 5 Drawing Sheets

SYSTEM AND METHOD FOR IMPLEMENTING A DISTRIBUTED SERVICE PLATFORM USING A SYSTEM-WIDE SWITCHTAG DEFINITION

BACKGROUND OF THE INVENTION

The tremendous growth of the Internet places enormous demands on network infrastructures. To cope with these demands, many modern routers employ a distributed architecture, where the performance of routing functions are distributed among the router's main processing components and the intelligent linecards installed within the router. Generally, a router with a distributed architecture is more efficient and is capable of providing more services than a router with a centralized architecture. Currently, when a network operator needs to introduce a new service or to upgrade an existing service, a router with a distributed architecture requires that all of the linecards in the router be upgraded. This causes unnecessary delay and effort every time a service introduction or a service upgrade is performed.

SUMMARY OF THE INVENTION

Briefly stated, this invention is directed to a system and method for configuring components of a distributed routing platform using switchtags. The distributed routing platform includes transport service modules that are configured to perform a service. Each of the transport service modules is configured to receive a packet and determine whether to perform the service on the packet. If the determination is positive, the transport service module performs the service. Otherwise, the transport service module encapsulates the packet with a switchtag and forwards the packet to another one of the transport service modules within the distributed routing platform that will perform the service on the packet.

In another aspect, the invention is directed to a method for configuring a distributed routing platform. The method allocates a switchtag that is associated with a service rule and creates a data rule and a control rule. The data rule is installed in one of the transport service modules coupled to distributed routing platform. The control rule is installed in the other second transport service modules.

In yet another aspect, the invention is directed to a method for routing a packet in a distributed routing platform. The method determines a switchtag and a forwarding location within the distributed routing platform. The packet is encapsulated with the switchtag and is sent to the forwarding location. In still another aspect, the switchtag encapsulating the packet is determined at the forwarding location. A destination and a service associated with the switchtag are also determined. The service is performed on the packet and the packet is forwarded to the destination.

DETAILED DESCRIPTION OF THE PREFERRED EMBODIMENT

Figure 1:
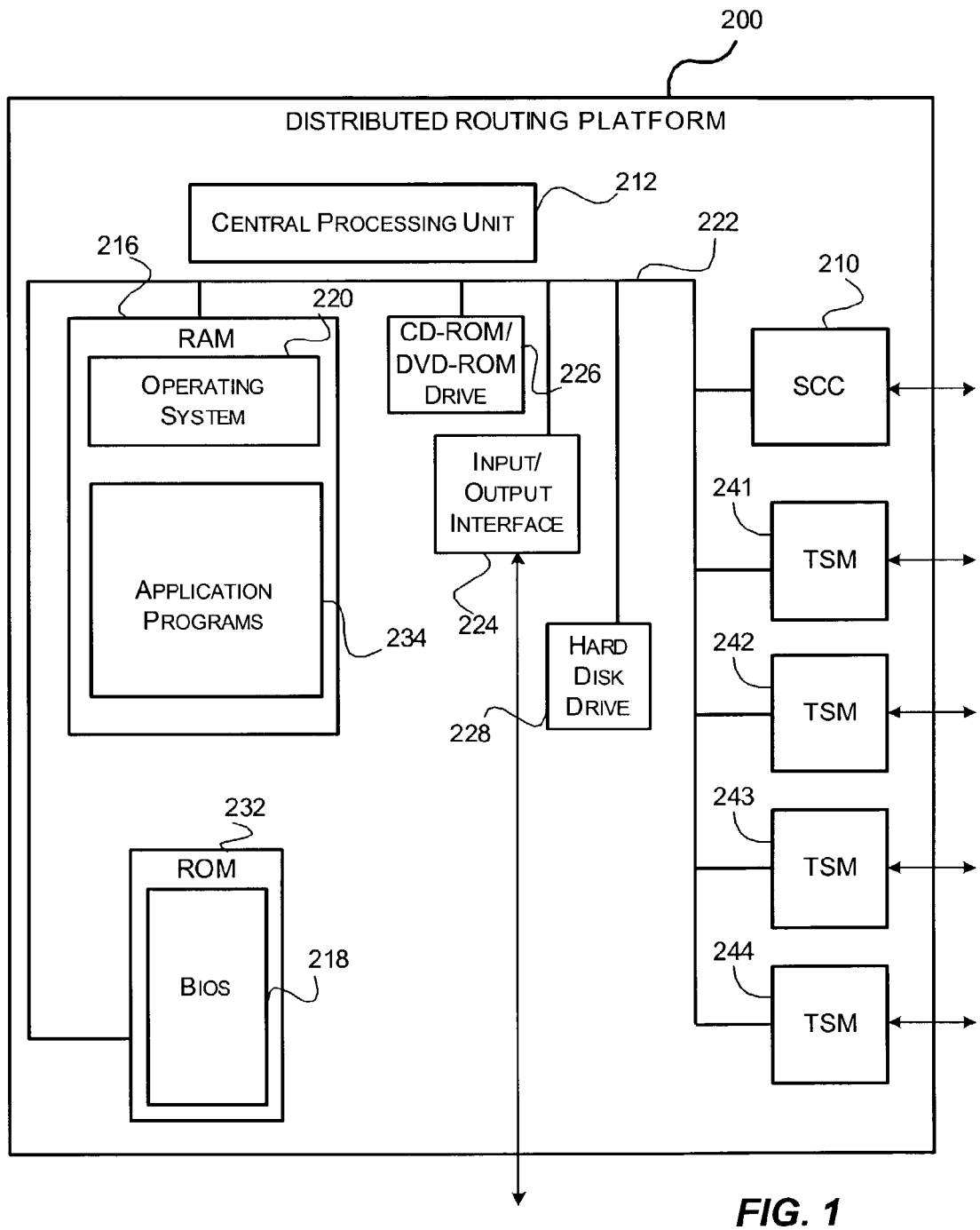
FIG. 1 shows an exemplary distributed routing platform.

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined by the appended claims.

Definitions

The definitions in this section apply to this document, unless the context clearly indicates otherwise. The phrase "this document" means the specification, claims, and abstract of this application.

"Including" and its variants mean including but not limited to. Thus, a list including A is not precluded from including B.

A "distributed routing platform" means a computing device that is capable of performing services and network routing functions, where the performance of the services and functions are distributed among the platform's system control points and service-creation/transport points.

A "packet" includes to an arbitrary or selectable amount of data that may be represented by a sequence of one or more bits. A packet may correspond to a data unit found in any layer of the Open Systems Interconnect (OSI) model, such as a segment, message, packet, datagram, frame, symbol stream, or stream, a combination of data units found in the OSI model, or a non OSI data unit.

A "System Control Card" means a system control point in a distributed routing platform that maintains system-wide information.

A "Transport Service Module" means a service-creation/transport point in a distributed routing platform that performs one or more services.

Referring to the drawings, like numbers indicate like parts throughout the figures and this document.

Definitions of terms are also found throughout this document. These definitions need not be introduced by using "means" or "refers" to language and may be introduced by example and/or function performed. Such definitions will also apply to this document, unless the context clearly indicates otherwise.

FIG. 1 shows an exemplary distributed routing platform 200. Such a distributed routing platform may be used, for example, as a server, workstation, network appliance, router, bridge, firewall, gateway, and/or as a traffic management device. It will be appreciated that distributed routing platform 200 may include many more components than those shown in FIG. 1. However, the components shown are sufficient to disclose an illustrative environment for practicing the present invention.

Distributed routing platform 200 may include processing unit 212 and a mass memory, all connected via bus 222. The mass memory generally includes random access memory ("RAM") 216, read-only memory ("ROM") 232, and one or more permanent mass storage devices, such as hard disk drive 228, a tape drive (not shown), optical drive 226, such as a CD-ROM/DVD-ROM drive, and/or a floppy disk drive (not shown). The mass memory stores application programs 234 and operating system 220 for controlling the operation of distributed routing platform 200. It will be appreciated that this component may comprise a general purpose operating system including, for example, UNIX, LINUX™, or one produced by Microsoft Corporation of Redmond, Wash. Basic input/output system ("BIOS") 218 is also provided for controlling the low-level operation of distributed routing platform 200.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Distributed routing platform 200 may also comprise input/output interface 224 for communicating with external devices, such as a mouse, keyboard, scanner, or other input devices not shown in FIG. 1. In some embodiments of the invention, distributed routing platform 200 does not include user input/output components. For example, distributed routing platform 200 may or may not be connected to a monitor. In addition, distributed routing platform 200 may or may not have input/output interface 224. For example, distributed routing platform 200 may implement a network appliance, such as a router, gateway, traffic management device, etc., that is connected to a network and that does not need to be directly connected to user input/output devices. Such a device may be accessible, for example, over a network.

As shown in FIG. 1, distributed routing platform 200 may be connected to one or more communications networks via system control card 210 and transport service modules 241–244. System control card 210 and transport service modules 241–244 include the necessary circuitry for connecting to networks, such as the Internet, local area networks, and the like. System control card 210 and transport service modules 241–244 are also configured to communicate with each other. System control card 210 and transport service modules 241–244 are constructed for use with various communication protocols including the TCP/IP protocol, and may include or interface with circuitry and components for transmitting messages and data over a wired and/or wireless communications medium. System control card 210 and transport service modules 241–244 may be implemented as linecards of distributed routing platform 200.

System control card 210 is a component of distributed routing platform 200 that manages services performed by transport service modules 241–244. For example, system control card 210 may be configured to install new service or update an existing service preformed by transport service modules 241–244.

Transport service modules 241–244 are components of distributed routing platform 200 that route packets received by the platform. Transport service modules 241–244 may be configured to perform one or more services on the data packets before routing them. Transport service modules 241–244 may be configured to perform the services or to forward the packets to another transport service module that perform the services. Each of transport service modules 241–244 may be individually upgraded by system control card 210.

Figure 2:
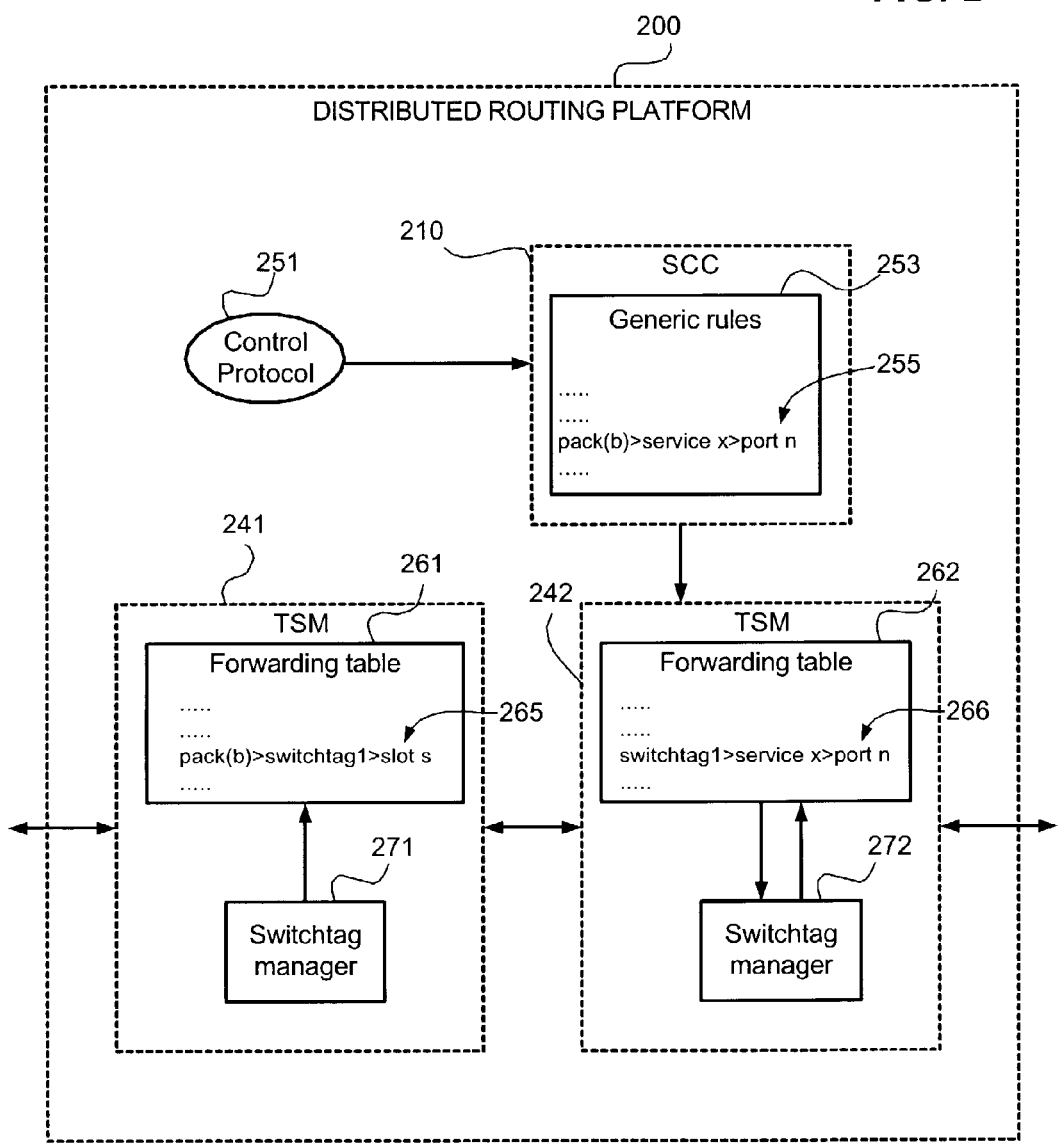
FIG. 2 is a schematic diagram illustrating components of the distributed routing platform in more detail.

FIG. 2 is a schematic diagram illustrating components of the distributed routing platform 200 in more detail. The operations of the components of distributed routing platform 200 will be described in conjunction with FIGS. 3, 4, and 5.

Service control card 210 is configured to interact with transport service modules in distributed routing platform 200, such as transport service modules 241–242. Service control card 210 is also configured to receive and handle service control protocol 251. Service control protocol 251 may include one or more service-specific rules for installation in transport service modules 241–242. Service control card 210 may translate these service-specific rules to generic rules 253 usable by transport service modules 241–242, and transmit the generic rules to transport service modules 241–242 for implementation. The generic rules may specify services that are performed on certain classes of packets by transport service modules 241–244 and the ports to which the packets are forwarded. For illustrative purposes, only generic rule 255 is shown in the figure.

Transport service modules 241–242 are configured to receive generic rules 253 from service control card 210 and use them to handle packets. Transport service modules 241–242 may perform the one or more services specified by generic rule 253 on a packet or forward the packet to another transport service module, depending on whether the transport service module is the one identified by the service control card as the performing linecard for generic rules 253.

As shown in the figure, transport service modules 241–242 contain corresponding forwarding tables 261–262 and switchtag managers 271–272. Forwarding tables 261–262 are used by transport service modules 241–242 to determine how to handle packets. Forwarding tables 261–262 may include one or more rules for handling packets. Forwarding tables 261–262 may include data rules and control rules. Each of the data rules and control rules is related to a particular generic rule. A transport service module identified as the performing linecard for the particular generic rule would install the associated data rule in its forwarding table and other transport service modules would install the control rule.

A control rule matches a particular class of packets with a corresponding switchtag. The class is defined by particular packet characteristics. Each control rule defines a particular slot to which to forward the packet. The slot is where the transport service module associated with the switchtag is installed in the distributed routing platform. The packet is encapsulated by the switchtag before it is forwarded to the slot. In the figure, forwarding table 261 is shown to contain control rule 265.

A data rule in a forwarding table may define one or more services to be performed on packets that are encapsulated by a particular switchtag. The TSM that performs the services using the switchtag of the packets to identify which data rule applies and perform the service defined by the data rule. The data rule may also specify a particular port to which the labeled packet would be forwarded. For illustrative purposes, forwarding table 262 is shown to contain data rule 266.

Switchtag managers 271–272 are components of transport service modules 241–242 that handle switchtags. For example, when transport service module 242 receives a generic rule from a service control card, switchtag manager 272 is configured to allocate a switchtag associated with the generic rule. The switchtag manager 272 is also configured to create a control rule and a data rule using the switchtag. The data rule is installed into the forwarding table of the transport service module and the control rule is transmitted to switchtag managers of other transport service modules, such as switchtag manager 271 in transport service module 241.

Figure 3:
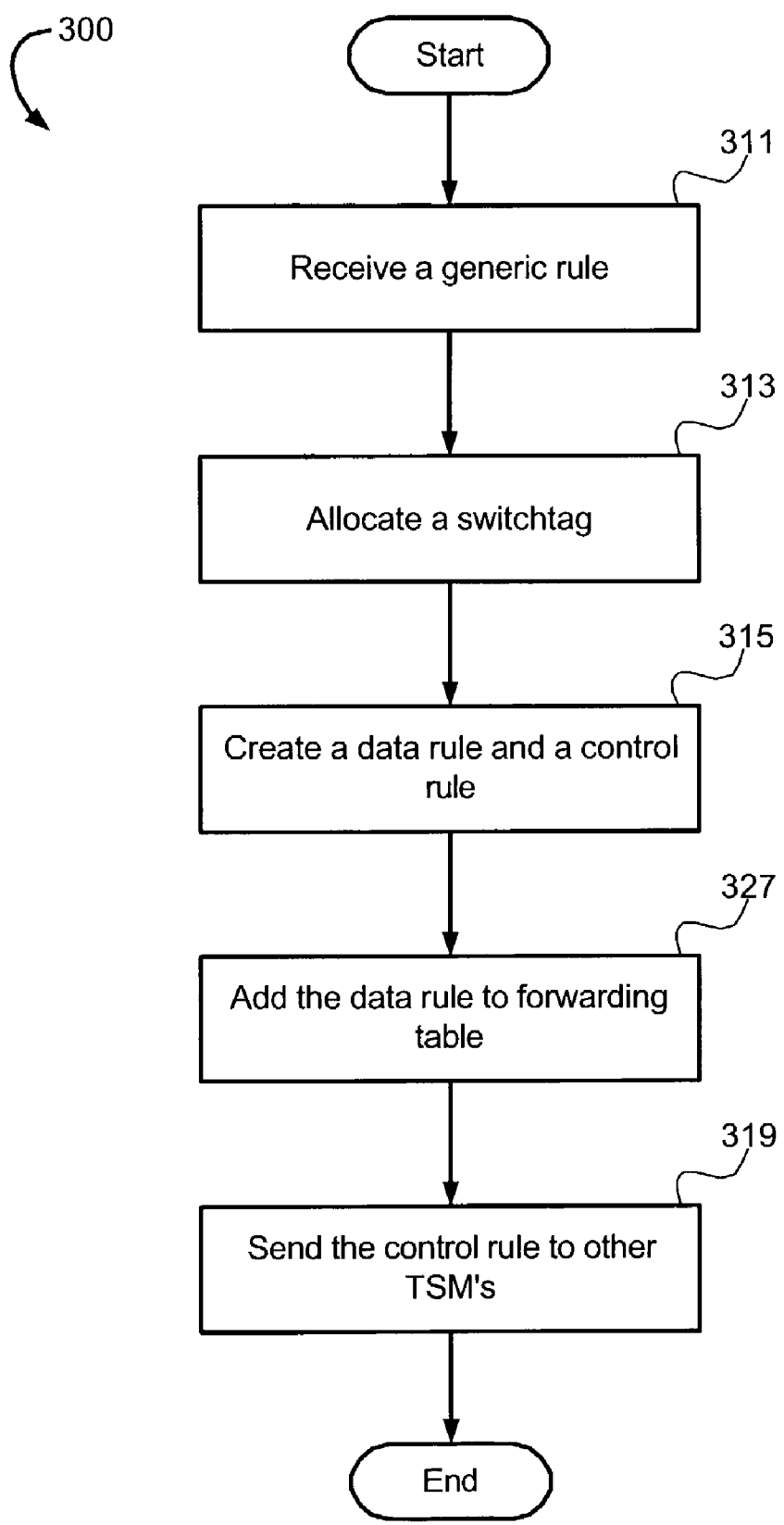
FIG. 3 is an operational flow diagram illustrating a process that a transport service module may employ to update or create a new service on a distributed routing platform.

FIG. 3 is an operational flow diagram illustrating a process 300 that a transport service module may employ to update or create a new service on a distributed routing platform. For the purposes of discussion, process 300 will be described in conjunction with FIG. 2. Process 300 may be implemented in a system with different components than those contained in distributed routing platform 200 illustrated in FIG. 2.

Moving from a start block, process 300 goes to block 311 where a generic rule is received from a service control card. The generic rule contains services and forwarding instructions applicable to a particular class of packets. In FIG. 2, generic rule 255 applies to packets with characteristics b. Generic rule 255 defines service x for performing on the applicable packets and designates port n as the packet forwarding port. Generic rule 255 is received by transport service module 242, which is identified by service control card 210 as the performing transport service module for generic rule 255.

The process continues at block 313 where a switchtag associated with the generic rule is allocated. The transport service module may associate a single switchtag with multiple rules based on one or more local policies. In FIG. 2, switchtag manager 272 in transport service module 242 allocates switchtag1 for generic rule 255.

Process 300 goes to block 315 where a data rule and a control rule associated with the generic rule is created using the allocated switchtag. In FIG. 2, switchtag manager 272 creates data rule 266 and control rule 265, which are associated with generic rule 255. Control rule 265 defines switchtag1 for encapsulate packets with characteristics b and specifies slot s to which to forward the encapsulated packet. Slot s is where transport service module 242 is installed. Data rule 266 specifies that service x be performed on packets encapsulated with switchtag1 and that the packets be forwarded to port n.

The process moves to block 327 where the data rule is added in the forwarding table. In FIG. 2, data rule 266 is added to the forwarding table 262 in transport service module 242. It is to be appreciated that an existing data rule may be updated in a similar manner.

The process continues at block 319 where the control rule is sent to other TSMs in the distributed routing platform. Process 300 then ends. In FIG. 2, switchtag manager 272 sends control rule 265 to switchtag manager 271 of transport service module 241. Control rule 265 is then installed in forwarding table 261 by switchtag manager 271.

Figure 4:
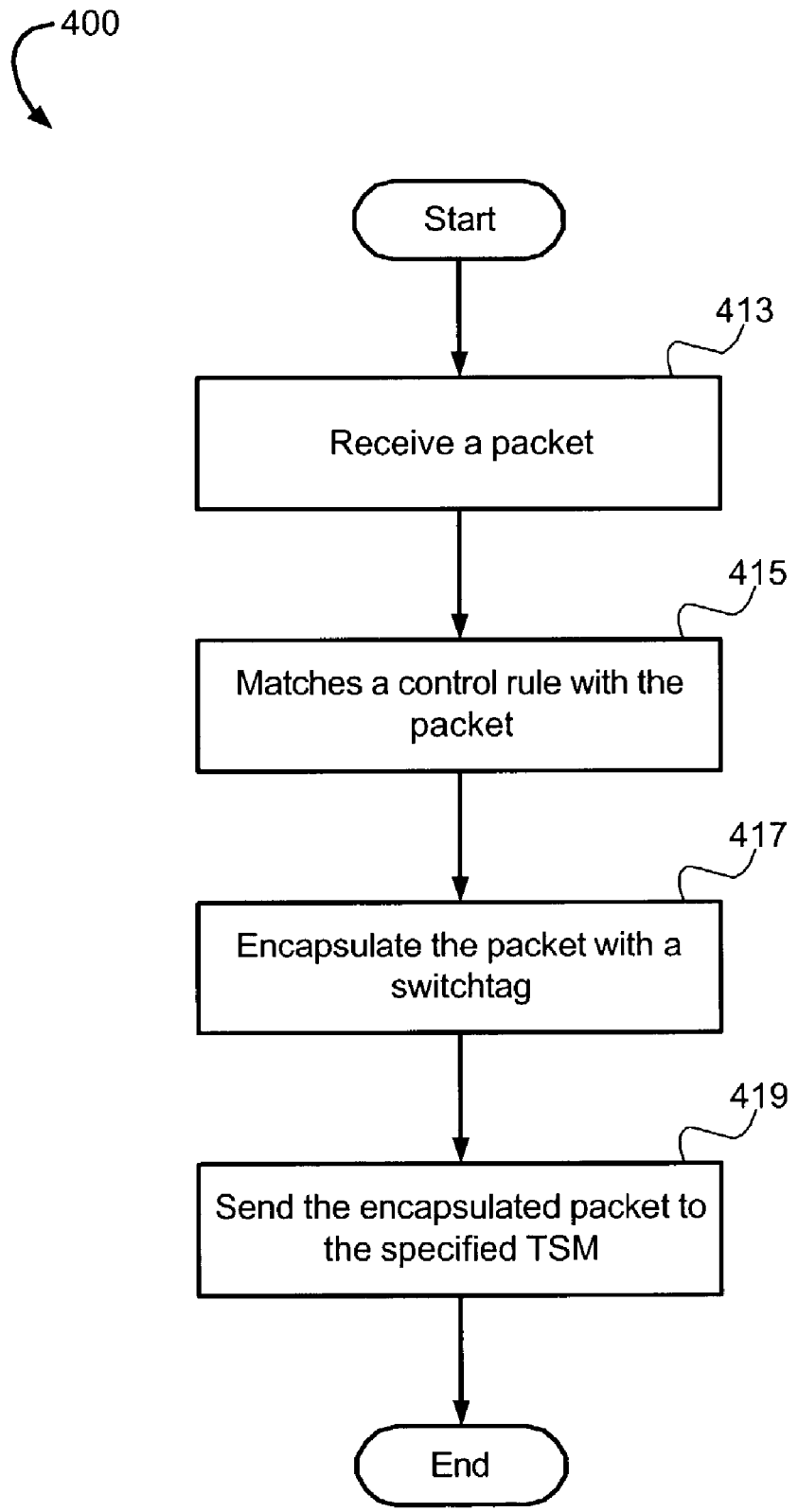
FIG. 4 is an operational flow diagram illustrating a process that a transport service module may use to send a packet to a transport service module that will perform a service on the packet.

FIG. 4 is an operational flow diagram illustrating a process that a transport service module may use to send a packet to a transport service module that will perform a service on the packet. For the purposes of discussion, process 400 will be described in conjunction with FIG. 2 where a packet with characteristics b is routed by distributed routing platform 200. Process 400 may be implemented in a system with different components than those contained in distributed routing platform 200 illustrated in FIG. 2.

From a start block, process 400 moves to block 413 where a packet is received. In FIG. 2, a packet with characteristics b is received by transport service module 241.

The process continues at block 415 where the packet is matched to a control rule. In FIG. 2, the packet with characteristics b is matched to control rule 265 in forwarding table 261. Control rule 265 associates switchtag1 and slot s with the packet.

Process 400 goes to block 417 where the packet is encapsulated with a switchtag. In FIG. 2, the packet with characteristics b is encapsulated with switchtag1. In one embodiment of the invention, the packet is encapsulated by modifying the header of the packet.

The process moves to block 419 where the encapsulated packet is forwarded to the specified transport service module. Then, the process ends. In FIG. 2, the packet encapsulated with switchtag1 is forwarded to slot s of distributed routing platform 200, which is the slot where transport service module 242 is installed.

Figure 5:
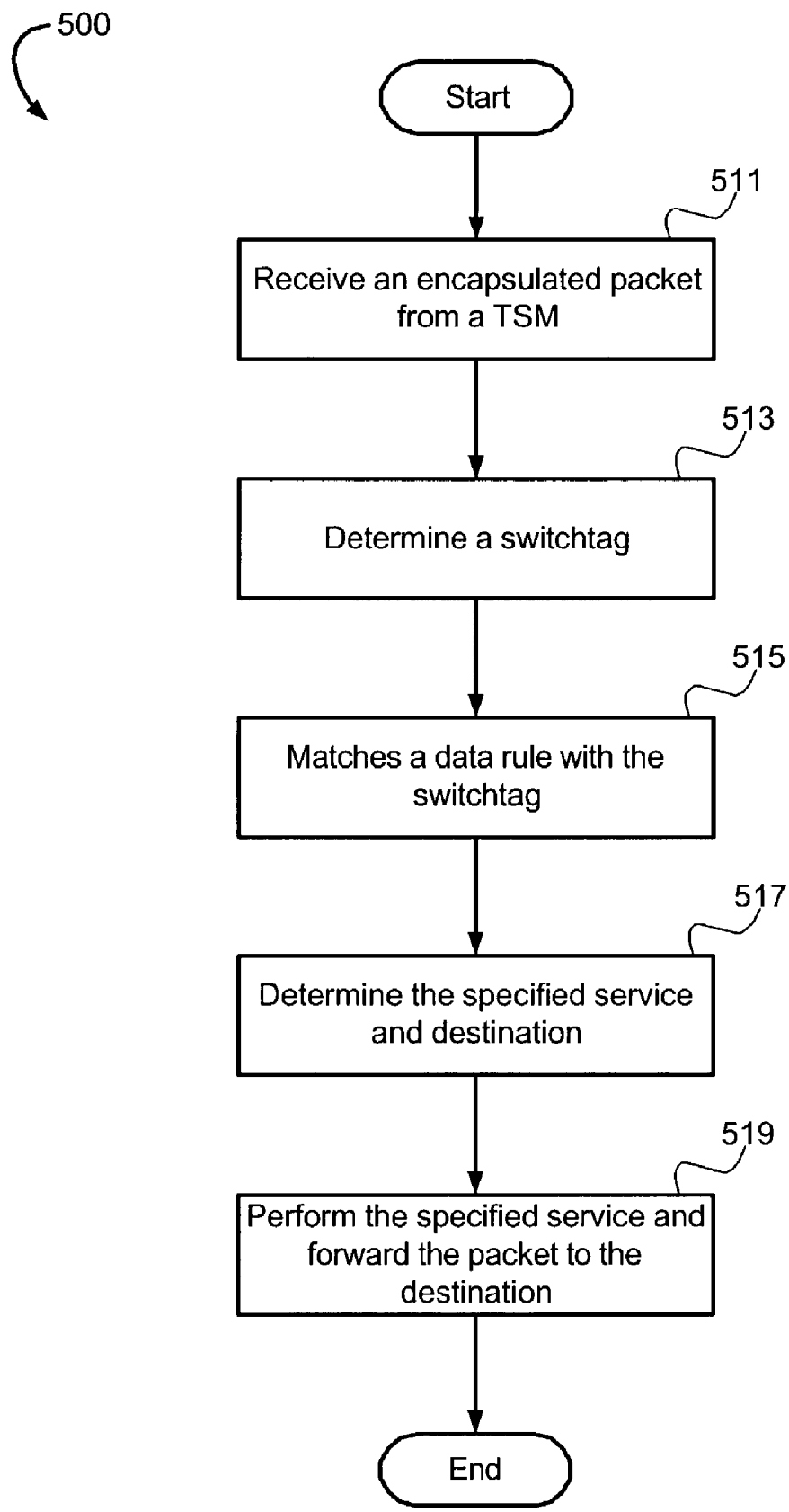
FIG. 5 is an operational flow diagram illustrating a process that a transport service module may use to perform a service on an encapsulated packet; in accordance with embodiments of the invention.

FIG. 5 is an operational flow diagram illustrating a process that a transport service module may use to perform a service on an encapsulated packet. For the purposes of discussion, process 500 will be described in conjunction with FIG. 2 where a packet encapsulated with switchtag1 is forwarded to transport service module 242. Process 500 may be implemented in a system with different components than those contained in distributed routing platform 200 illustrated in FIG. 2.

Moving from a start block, the process goes to block 511 where an encapsulated packet is received from another transport system module. Process 500 continues at 513 where the switchtag encapsulating the packet is determined. In FIG. 2, a packet sent by transport service module 241 and encapsulated with switchtag1 is received by transport service module 242.

The process moves to block 515 where the switchtag is matched to a data rule. In FIG. 2, transport service module 262 matches data rule 266 in forwarding table 262 with switchtag1.

Process 500 goes to block 517 where the service and destination of the packet is determined from the data rule. In FIG. 2, data rule 266 associates service x and port n with switchtag1.

The process continues at block 519 where the specified service is performed and the packet is sent to the specified destination. Then, process 500 ends. In FIG. 2, transport service module 242 performs service x on the packet and sends the packet to port n.

The above specification, examples and data provide a complete description of the invention. Since many embodiments of the invention can be made without departing from the spirit and scope of the invention, the invention resides in the claims hereinafter appended.

What is claimed is:

1. A distributed routing platform comprising:
   a service control card to provide a generic rule for each class in a plurality of classes of packets, wherein the generic rule for a particular class indicates a service to be provided to each packet in that class;
   a plurality of transport service modules, wherein each of the transport service modules is configured to:
   receive, from the service control card, the generic rule for a class of packets, wherein the generic rule indicates a service provided by that transport service module, and generate from the generic rule i) a data rule indicating the service to be provided by that transport service module to the particular class of packets indicated in the generic rule: and ii) a control rule indicating that packets should be forwarded to that transport service module for performing the service on the particular class of packets;

transmit the control rule to at least one other transport service module;

receive a packet and determine the class of the packet;

determine, using the data rule or the control rule associated with the class of the received packet, whether to perform a service on the packet at this transport service module according to the data rule associated with the class of the received packet or forward the packet to another transport service module to perform the service according to the control rule associated with the class of the received packet, and if the determination is to perform the service at this transport service module, perform the service;

otherwise, encapsulate the packet with a switchtag and forward the packet to the other transport service module to perform the service on the packet.

2. The distributed routing platform of claim 1, wherein the determination of whether to perform the service on the packet further comprises reference to a forwarding table.

3. The distributed routing platform of claim 2, wherein the forwarding table further comprises a control rule that associates the packet with the switchtag.

4. The distributed routing platform of claim 3, wherein the control rule further comprises an association of the packet with the other transport service module.

5. The distributed routing platform of claim 2, wherein the forwarding table further comprises a data rule that associates the packet with the service.

6. The distributed routing platform of claim 5, wherein the data rule further comprises an association of the packet with a destination, and wherein the transport service module is further configured to forward the packet to the destination.

7. The distributed routing platform of claim 1, wherein the service control card is configured to receive a service rule associated with the service; translate the service rule to a generic rule; and send the generic rule to at least one of the transport service modules.

8. The distributed routing platform of claim 7, wherein each of the transport service modules further comprises a switchtag manager configured to allocate the switchtag associated with the generic rule and to create the data rule and the control rule using the switchtag, and wherein the transport service module is further configured to receive the generic rule.

9. The distributed routing platform of claim 8, wherein the switchtag manager is further configured to send the control rule to the transport service modules.

10. A method for configuring a distributed routing platform comprising:

translating a service control rule to a generic rule;

transmitting the generic rule, wherein the generic rule indicates a service to be provided to each packet in a particular class of packets specified by the generic rule;

allocating a switchtag associated with the generic rule;

creating a data rule associated with the generic rule, wherein the data rule indicates the service to be provided by a first transport service module to the particular class of packets indicated in the generic rule;

creating a control rule associated with the generic rule, wherein the control rule indicates that packets should be forwarded to the first transport service module for performing the service on the particular class of packets;

installing the data rule in the first transport service module; and installing the control rule in a second transport service module.

11. The method of claim 10, wherein the service rule further comprises identifiers for packet characteristics, a service, and a destination.

12. The method of claim 11, wherein the data rule further comprises identifiers for the switchtag, the service and the destination.

13. The method of claim 11, wherein the control rule further comprises identifiers for packet characteristics, the switchtag, and allocation of the first transport service module.

14. The method of claim 10, further comprising installing the data rule in a forwarding table associated with the first transport service module.

15. The method of claim 10, further comprising installing the control rule in a forwarding table associated with the second transport service module.

16. A method for routing a packet in a distributed routing platform comprising:

transmitting a generic rule for each of a plurality of classes of packets, wherein the generic rule indicates a service to be provided to each packet in a particular class of packets specified by the generic rule;

allocating a switchtag associated with the generic rule;

creating a data rule associated with the generic rule, wherein the data rule indicates the service to be provided by a first transport service module to the particular class of packets indicated in the generic rule;

creating a control rule associated with the generic rule, wherein the control rule indicates that packets should be forwarded to the first transport service module for performing the service on the particular class of packets;

receiving the packet at a transport service module and determining the class of the packet;

determining a switchtag;

determining, using the data rule or the control rule associated with the class of the received packet, whether to perform a service on the received packet at the transport service module according to the data rule or forward the received packet to the first transport service module to perform the service according to the control rule; and if the service is not to be performed at the transport service module, determining a forwarding location of the first transport service module;

encapsulating the received packet with the switchtag; and sending the encapsulated packet to the forwarding location.

17. The method of claim 16, wherein determining the switchtag and determining the forwarding location further comprises matching the packet with a control rule.

18. The method of claim 16, wherein encapsulating the packet further comprises including the switchtag in the packet.

19. The method of claim 16, further comprising:

at the forwarding location, determining a switchtag encapsulating the packet;

determining a destination and a service associated with the switchtag;
performing the service on the packet; and
forwarding the packet to the destination.

20. The method of claim 19, wherein determining the destination and the service further comprises matching the encapsulating switchtag with a data rule.

21. A device for routing a packet in a distributed routing platform comprising:
means for transmitting a generic rule for each of a plurality of classes of packets, wherein the generic rule indicates a service to be provided to each packet in a particular class of packets specified by the generic rule;
means for allocating a switchtag associated with the generic rule;
means for creating a data rule associated with the generic rule, wherein the data rule indicates the service to be provided by a first transport service module to the particular class of packets indicated in the generic rule;
means for creating a control rule associated with the generic rule, wherein the control rule indicates that packets should be forwarded to the first transport service module for performing the service on the particular class of packets;
means for receiving a packet and determining the class of the packet;
means for determining a switchtag associated with a service rule;
means for determining, using the data rule or the control rule associated with the class of the received packet, whether to perform a service on the received packet at the transport service module according to the data rule or to forward the received packet to the first transport service module according to the control rule; and
if the service is not to be performed at the transport service module, means for determining a forwarding location of the first transport service module;
means for encapsulating the received packet with the switchtag; and
means for sending the encapsulated packet to the forwarding location to perform the service.

22. A method for routing a packet in a distributed routing platform, the method comprising:
transmitting a plurality of generic rules, wherein each of the generic rule indicates a service to be provided to a particular class of packets specified by the generic rule;
creating a data rule associated with the generic rule, wherein the data rule indicates the service to be provided by a first transport service module to the particular class of packets indicated in the generic rule;
creating a control rule associated with the generic rule, wherein the control rule indicates that packets should be forwarded to the first transport service module for performing the service on the particular class of packets;
receiving the packet at a second transport service module of the distributed routing platform and determining the class of the packet;
encapsulating the packet with a first switchtag directing the packet to the first transport service module of the distributed routing platform to perform a service on the packet according to the control rule;
receiving the packet with the first switchtag at the first transport service module and performing the service on the packet;
encapsulating the packet with a second switchtag directing the packet to a destination; and
forwarding the packet to the destination.

23. A distributed routing platform comprising:
a service control card and a plurality of transport service modules,
wherein, for at least one class of packets in a plurality of classes of packets, the service control card is configured to:
determine a service to be performed on that class of packets; and
generate a generic rule associated with that class of packets and indicating that the service is to be performed at a first subset of the transport service modules;
wherein at least one of the first subset of transport service modules is configured
create a data rule associated with the generic rule for that class of packets, wherein the data rule indicates the service to be provided by that transport service module to that class of packets indicated in the generic rule;
install the data rule in a forwarding table of the transport service module that created the data rule;
create a control rule associated with the generic rule for that class of packets, wherein the control rule indicates that packets should be forwarded to the transport service module for performing the service on that class of packets;
transmit the control rule to at least one of a remainder of the transport service modules that are not in the first subset;
upon receiving a packet in that class of packets, perform the service on the packet according to the data rule; and
encapsulate the packet with a switchtag and forward the packet to a destination; and
wherein each of the remainder of the transport service modules is configured to:
upon receiving a packet in that class of packets, encapsulate the packet with a switchtag directing the packet to a one of the first subset of transport service modules to perform the service according to the control rule.

* * * * *